(12) United States Patent
Kim

(10) Patent No.: US 12,214,634 B2
(45) Date of Patent: Feb. 4, 2025

(54) TOWING CAP AND BUMPER COVER OF VEHICLE HAVING SAME

(71) Applicant: HYUNDAI MOBIS Co., Ltd., Seoul (KR)

(72) Inventor: SeongKwon Kim, Hwaseong-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 414 days.

(21) Appl. No.: 17/541,624

(22) Filed: Dec. 3, 2021

(65) Prior Publication Data
US 2022/0176761 A1 Jun. 9, 2022

(30) Foreign Application Priority Data
Dec. 8, 2020 (KR) .......................... 10-2020-0170874

(51) Int. Cl.
*B60D 1/60* (2006.01)
*B60D 1/52* (2006.01)
*B60D 1/56* (2006.01)

(52) U.S. Cl.
CPC .................. *B60D 1/60* (2013.01); *B60D 1/52* (2013.01); *B60D 1/56* (2013.01)

(58) Field of Classification Search
CPC ... B60D 1/60; B60D 1/52; B60D 1/56; B60D 1/605; B60R 19/24; B60R 19/48
See application file for complete search history.

(56) References Cited

U.S. PATENT DOCUMENTS

| | | | |
|---|---|---|---|
| 8,251,414 B2 * | 8/2012 | Brown | B60R 19/48 293/102 |
| 8,562,062 B2 * | 10/2013 | Mineshima | B60R 19/023 362/509 |
| 10,414,367 B2 * | 9/2019 | Allmann | B60R 19/48 |

FOREIGN PATENT DOCUMENTS

| | | | | |
|---|---|---|---|---|
| CN | 107639981 A | * | 1/2018 | |
| CN | 109017177 A | * | 12/2018 | ............. B60D 1/565 |
| CN | 208867804 U | * | 5/2019 | |

\* cited by examiner

*Primary Examiner* — Paul N Dickson
*Assistant Examiner* — Sara Laghlam
(74) *Attorney, Agent, or Firm* — NSIP Law

(57) ABSTRACT

A bumper cover of a vehicle includes a cover frame and a towing cap. The cover frame includes: a hook hole through which a hook configured to tow a vehicle body passes; and an installation hole disposed near the hook hole. The towing cap includes: a cap part configured to open and close the hook hole; and an anchor part protruding outward from the cap part in a bent shape and fixedly inserted into the installation hole. The towing cap is out of contact with the hook in a configuration in which the cap part opens the hook hole.

12 Claims, 7 Drawing Sheets

TOWING CAP AND BUMPER COVER OF VEHICLE HAVING SAME

CROSS-REFERENCE TO RELATED APPLICATIONS

This application claims the benefit under 35 U.S.C. § 119(a) of Korean Patent Application No. 10-2020-0170874 filed on Dec. 8, 2020 in the Korean Intellectual Property Office, the entire disclosure of which is incorporated herein by reference for all purposes.

BACKGROUND

1. Field

The present invention relates to a towing cap and a bumper cover of a vehicle having the same.

2. Discussion of Related Art

Generally, a towing hook of a vehicle is used to move the vehicle using an external force when the vehicle cannot move by itself due to an accident or breakdown and is fixed to a member installed inside a bumper cover of the vehicle.

In the case of most vehicles, a towing hook formed in a ring shape is installed on a vehicle frame of an inner portion of a bumper cover by being fixedly welded or bolted.

However, since the towing hook is always exposed to the outside, a problem of colliding with an object on a road surface occurs while the vehicle travels, and thus, a towing cap is coupled thereto in order to prevent the exposure.

The towing cap has problems in that an additional tool is needed to separate the towing cap from a bumper when the towing cap is detached and attached in a process in which the towing cap is separated from the bumper using the additional tool, not only a scratch or damage may occur on a coated surface of the bumper, but also a paint and the like may be peeled off.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a bumper cover of a vehicle includes a cover frame and a towing cap. The cover frame includes: a hook hole through which a hook configured to tow a vehicle body passes; and an installation hole disposed near the hook hole. The towing cap includes: a cap part configured to open and close the hook hole; and an anchor part protruding outward from the cap part in a bent shape and fixedly inserted into the installation hole. The towing cap is out of contact with the hook in a configuration in which the cap part opens the hook hole.

The cap part may be coupled to a peripheral portion of the hook hole in a snap-fit manner.

The cap part may include ribs protruding from an inner surface of the cap part, parallel to each other and spaced apart from each other in a width direction.

The cap part may include protrusions protruding from an outer surface of the cap part at intervals.

The protrusions may each have a structure inclined downward in a direction from an outside of the cap part toward an inside of the cap part.

The anchor part may include: an anchor shaft extending from an inner surface of the cap part; and an anchor ring bent outward from the anchor shaft and press-fitted to the installation hole.

The anchor shaft and the anchor ring may be integrally formed with each other.

The anchor shaft may be detachable from and attachable to the inner surface of the cap part.

The anchor ring may include a frame part and a variable hook part. The frame part may include: a shaft extending perpendicular to the anchor shaft; and reinforcing members disposed on the shaft. The variable hook part may perpendicularly branch off into two branches from an end portion of the anchor shaft, and may surround the frame part. The variable hook part may pass through the installation hole and include fixing steps disposed in a part of a central portion of the variable hook part.

The variable hook part may have a width decreasing in a direction toward an end portion of the variable hook part passing through the installation hole.

In another general aspect, a towing cap configured to open and close a hook hole disposed in a bumper cover for towing a vehicle body includes: a cap part configured to open and close the hook hole; and an anchor part extending outward from the cap part in a bent shape and fixedly inserted into an installation hole disposed around the hook hole. The cap part is further configured to open the hook hole of the bumper cover in a state in which the cap part does is out of contact with a hook passing through the hook hole The anchor part may include: an anchor shaft extending from an inner surface of the cap part; and an anchor ring bent outward from the anchor shaft and press-fitted to the installation hole.

The anchor shaft may be detachable from and attachable to the inner surface of the cap part.

The anchor ring may include a frame part and a variable hook part. The frame part may include: a shaft extending perpendicular to the anchor shaft; and reinforcing members disposed on the shaft. The variable hook part may perpendicularly branch off into two branches from an end portion of the anchor shaft, and may surround the frame part.

In another general aspect, a towing cap configured to open and close a hook hole disposed in a bumper cover of a vehicle includes: a cap part and an anchor part. The cap part is configured to open and close the hook hole. The anchor part includes: an anchor shaft extending from an inner surface of one side of the cap part; and an anchor ring bent outward from the anchor shaft and press-fitted to an installation hole of the bumper cover. The cap part is controllable to be eccentrically rotated in a direction perpendicular to the anchor shaft by using the anchor shaft as a rotary axis.

The anchor shaft may be detachable from and attachable to an inner surface of the cap part.

Other features and aspects will be apparent from the following detailed description, the drawings, and the claims.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Advantages and features of the present invention and methods of achieving the same will be clearly understood with reference to the following exemplary embodiments described in detail with the accompanying drawings. However, the present invention is not limited to the embodiments to be disclosed below and may be implemented in various different forms. The embodiments are provided only in order to fully describe the present invention and fully notify the scope of the present invention to those skilled in the art, and the scope of the present invention is defined by the appended claims. Meanwhile, the terms used herein are provided only to describe the embodiments of the present invention and are not for purposes of limitation. Unless the context clearly indicates otherwise, the singular forms described in the specification include the plural forms. In addition, the terms "comprise," or "comprising," used herein are used with a meaning of specifying some stated components, steps, operations and/or elements but do not preclude the presence or addition of one or more other components, steps, operations and/or elements.

Hereinafter, exemplary embodiments of the present invention will be described in detail with reference to the accompanying drawings.

Figure 1:
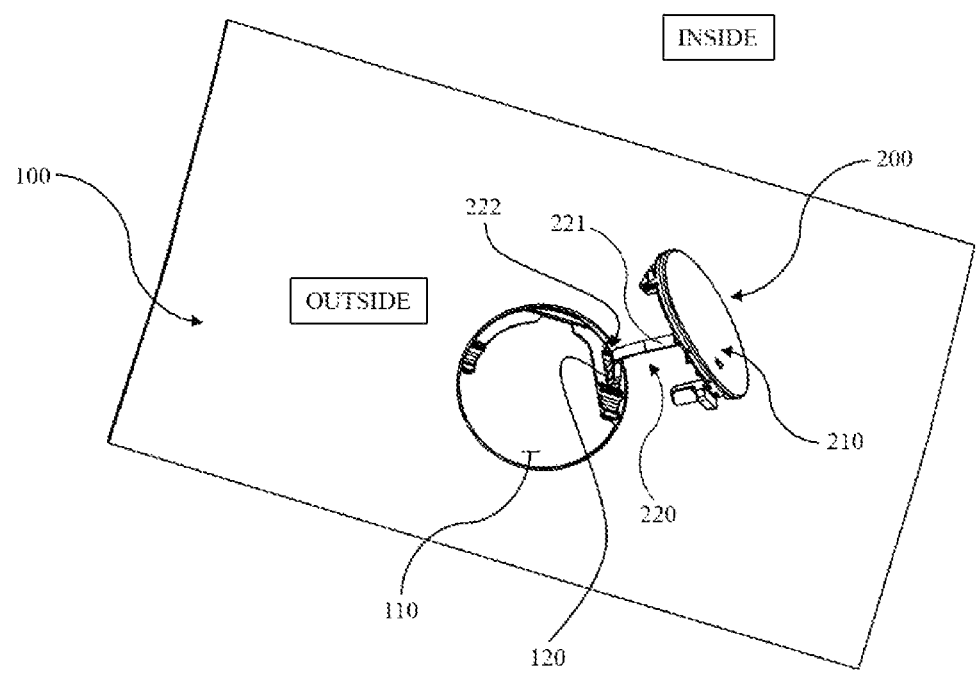
FIG. 1 is a schematic front view illustrating a bumper cover on which a towing cap according to one embodiment of the present invention is installed.
Figure 2:
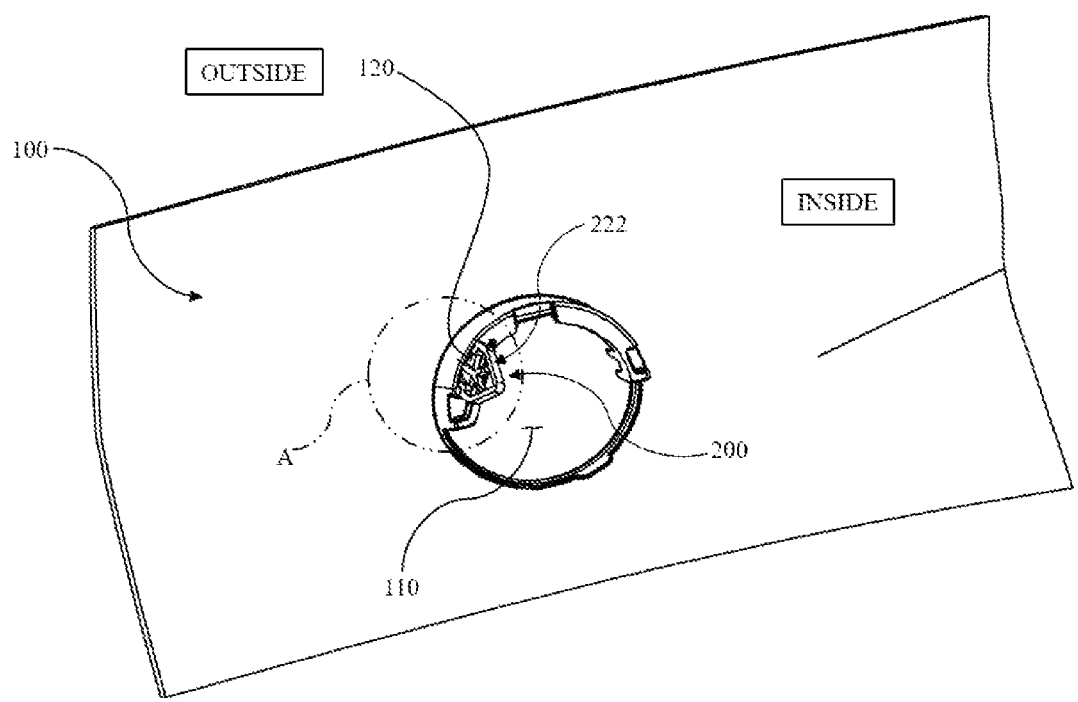
FIG. 2 is a schematic rear view illustrating the bumper cover on which the towing cap according to one embodiment of the present invention is installed.
Figure 3:
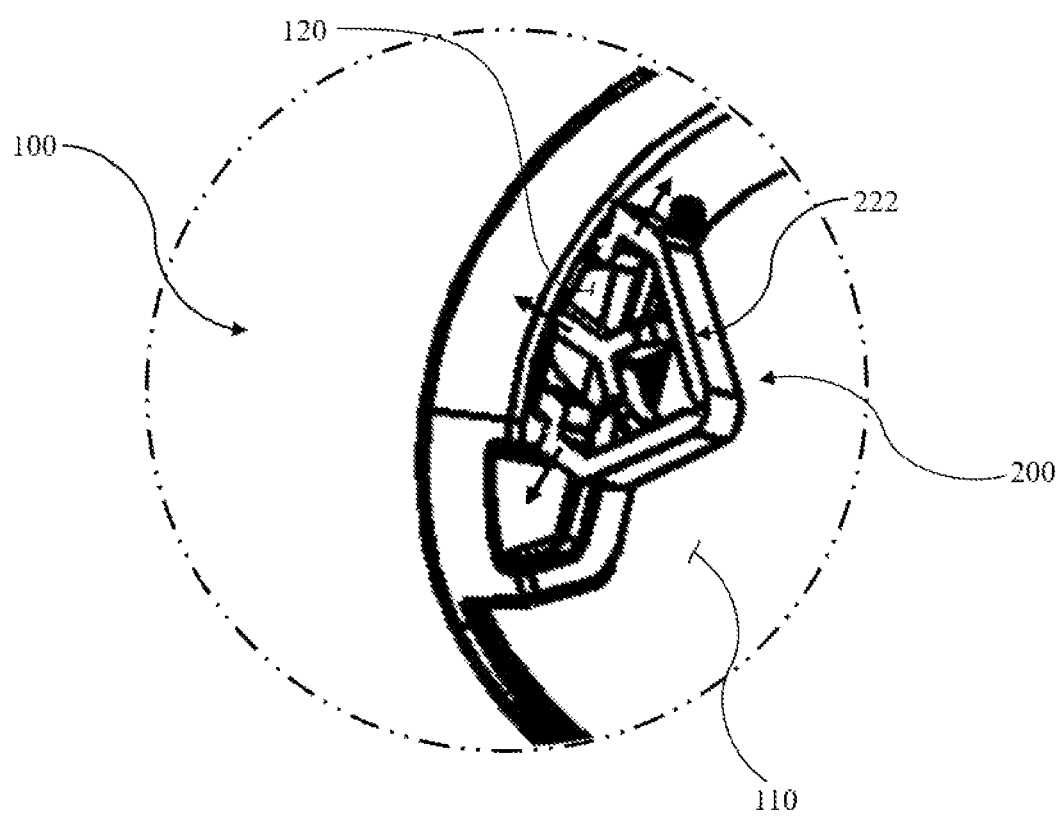
FIG. 3 is an enlarged view illustrating a portion A of FIG. 2.
Figure 4:
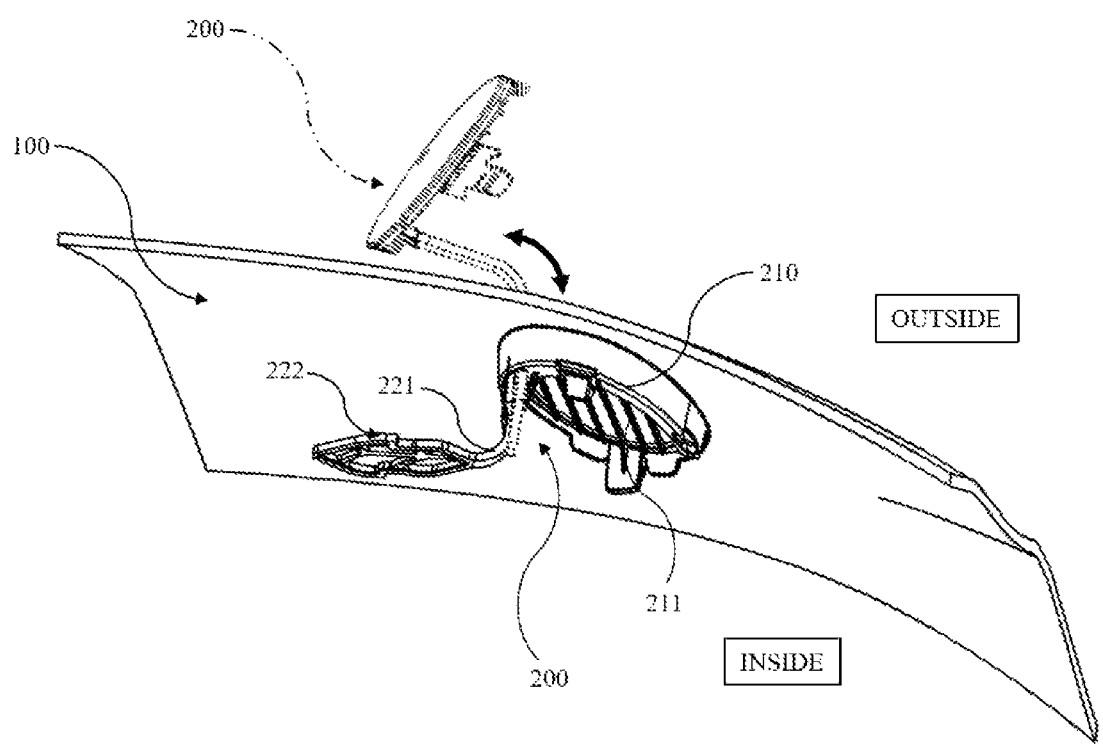
FIG. 4 is a view for describing a structural feature of the towing cap installed on the bumper cover according to one embodiment of the present invention.

FIG. 1 is a schematic front view illustrating a bumper cover on which a towing cap according to one embodiment of the present invention is installed, FIG. 2 is a schematic rear view illustrating the bumper cover on which the towing cap according to one embodiment of the present invention is installed, FIG. 3 is an enlarged view illustrating a portion A of FIG. 2, and FIG. 4 is a view for describing a structural feature of the towing cap installed on the bumper cover according to one embodiment of the present invention.

Referring to FIGS. 1 to 4, a bumper cover 10 includes a cover frame 100 and a towing cap 200.

The cover frame 100 includes a hook hole 110 through which a hook (not shown) provided for towing a vehicle body passes and an installation hole 120 near the hook hole 110.

The towing cap 200 includes a cap part 210 and an anchor part 220.

The cap part 210 opens and closes the hook hole 110 of the cover frame 100.

The anchor part 220 extends outward from the cap part 210 in a bent shape and is fixedly inserted into the installation hole 120 of the cover frame 100.

The towing cap 200 has a structural feature of not coming into contact with a hook when the cap part 210 opens the hook hole 110 of the cover frame 100 in a state in which the anchor part 220 is fixed to the installation hole 120 of the cover frame 100.

The structural feature is meaningful in that a coated surface of the bumper cover 10 is not damaged because the towing cap 200 is held when the towing cap 200 is opened or closed.

The cap part 210 may be coupled to a peripheral portion of the hook hole 110 of the cover frame 100 in a snap-fit manner.

The cap part 210 includes a plurality of ribs 211 protruding from an inner surface thereof in parallel to be spaced apart from each other in a width direction in order to improve durability.

When the anchor part 220 of the towing cap 200 passes through the installation hole 120 of the cover frame 100 and is completely pulled by an operator, a position and a shape of the towing cap 200 are fixed by a tension force in a state in which the towing cap 200 is completely opened.

The anchor part 220 includes an anchor shaft 221 and an anchor ring 222.

The anchor shaft 221 extends from the inner surface of the cap part 210.

The anchor ring 222 has a structure formed to be bent outward from the anchor shaft 221 and press-fitted to the installation hole 120 of the cover frame 100. An end of the anchor ring 222 may be formed in an arrow shape.

The anchor shaft 221 and the anchor ring 222 may be integrally formed as one injection molding part or may have structures which are detachable from and attachable to each other.

In this case, the anchor shaft 221 may be formed as a structure which is detachable from and attachable to the inner surface of the cap part 210.

Figure 5:
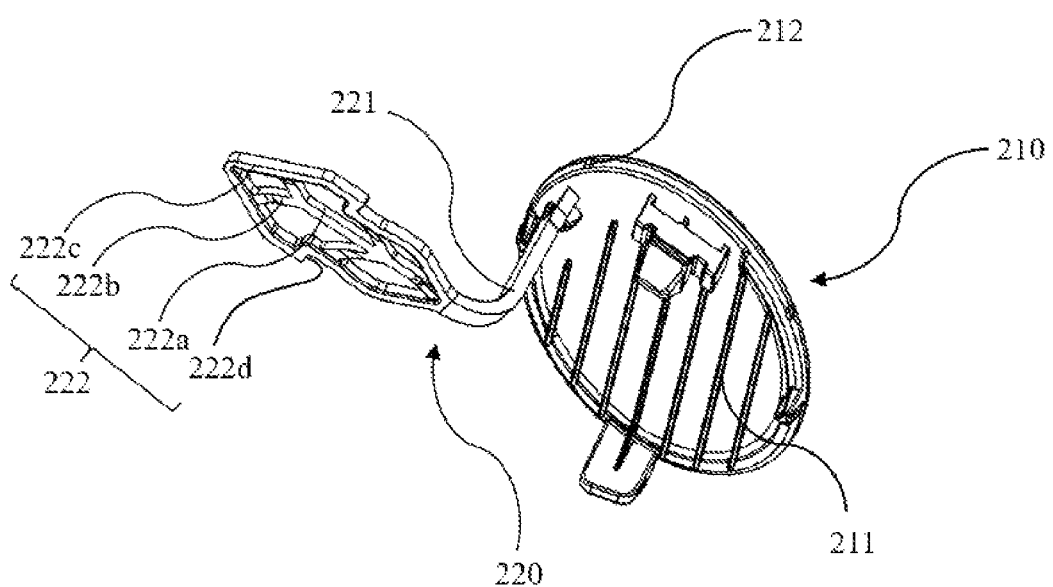
FIGS. 5 to 7 are views illustrating the towing cap according to one embodiment of the present invention when viewed at a plurality of angles.
Figure 6:
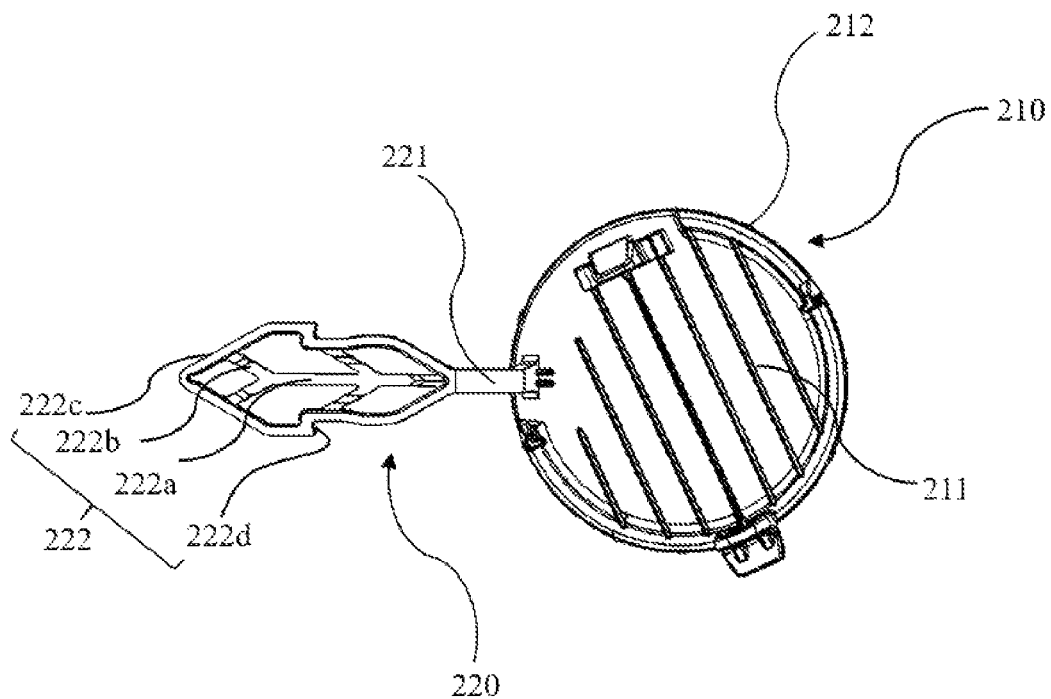
Figure 7:
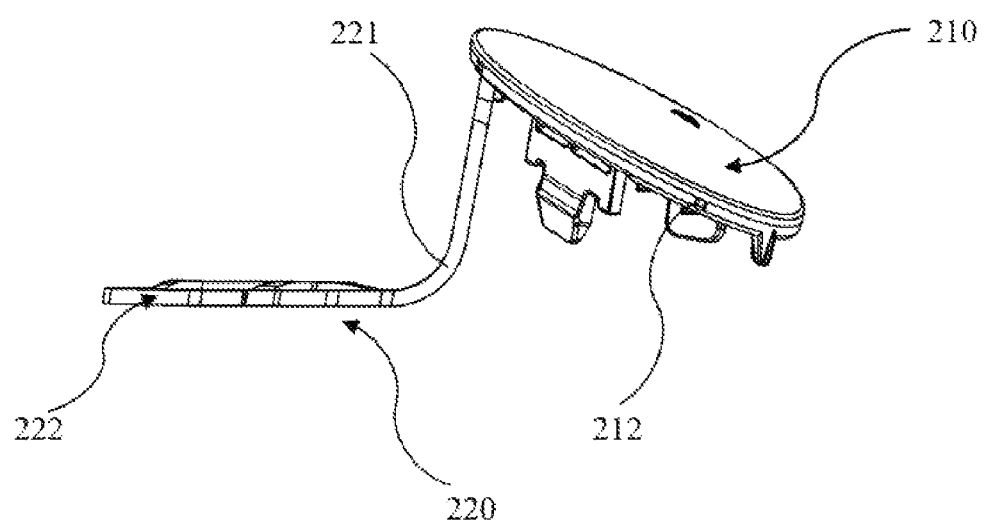

FIGS. 5 to 7 are views illustrating the towing cap according to one embodiment of the present invention when viewed at a plurality of angles. FIGS. 5 to 7 will be described with reference to FIGS. 1 to 4 in order to specify descriptions of the corresponding drawings.

The towing cap 200 mainly includes the cap part 210 and the anchor part 220.

The cap part 210 has an outer surface, which is a coated surface which is the same as a surface of an exterior of the vehicle body, in order to improve convenience of work when the operator opens and closes the hook hole 110 of the cover frame 100 and maintain the exterior of the vehicle body and has the inner surface on which the ribs 211 are formed in order to improve durability.

The cap part 210 may also include a plurality of protrusions 212 protruding at predetermined intervals on an outer surface thereof in order to improve durability.

In this case, the protrusion 212 has a structure inclined downward in a direction from an outside toward an inside of the cap part 210.

The anchor part 220 includes the anchor shaft 221 and the anchor ring 222, and descriptions about the corresponding components will be omitted.

The anchor ring 222 includes a frame part 222a and a variable hook part 222c.

The frame part 222a constitutes a shaft perpendicular to the anchor shaft 221 and includes a plurality of reinforcing members 222b on the shaft.

The variable hook part 222c perpendicularly branches off into two branches from an end portion of the anchor shaft 221 and surrounds the frame part 222a.

In this case, the variable hook part 222c passes through the installation hole 120 of the cover frame 100 and includes fixing steps 222d in a part of a central portion thereof.

The variable hook part 222c has a structure having a width decreasing in a direction toward one end portion passing through the installation hole 120 of the cover frame 100.

Meanwhile, in another embodiment of a towing cap 200, a cap part 210 may also be controlled to be eccentrically rotated in a direction perpendicular to the anchor shaft 221 by using an anchor shaft 221 as a rotary axis.

In this case, there is a great feature in that an operator can rotate the towing cap 200 in a desired direction using one hand when the towing cap 200 is rotated.

According to the present invention, since an anchor shaft has a structure that is bent outward, even in a state in which a towing cap is opened, the anchor shaft does not come into contact with an entrance path of a hook so that damage of a coated surface of a bumper cover can be prevented.

Particularly, since the towing cap is fixed in a state in which a hook hole of a cover frame is opened, a towing hook can be coupled without additional holing so that work efficiency can be improved.

The present invention is not limited to the embodiments described above and may be variously modified within a range allowed by the technical sprit of the present invention.

What is claimed is:

1. A bumper cover of a vehicle, comprising:
  a cover frame including:
    a hook hole through which a hook configured to tow a vehicle body passes; and
    an installation hole disposed near the hook hole; and
  a towing cap including:
    a cap part configured to open and close the hook hole; and
    an anchor part protruding outward from the cap part in a bent shape and fixedly inserted into the installation hole, the anchor part including an anchor shaft extending from an inner surface of the cap part, and an anchor ring bent outward from the anchor shaft and configured to be press-fitted to the installation hole,
  wherein the towing cap is out of contact with the hook in a configuration in which the cap part opens the hook hole, and
  wherein the cap part comprises protrusions that protrude at predetermined intervals from an outer surface of the cap part, each of the protrusions having a structure inclined downward in a direction from an outside of the cap part toward an inside of the cap part.

2. The bumper cover of claim 1, wherein the cap part is coupled to a peripheral portion of the hook hole in a snap-fit manner.

3. The bumper cover of claim 1, wherein the cap part includes ribs protruding from an inner surface of the cap part, parallel to each other and spaced apart from each other in a width direction.

4. The bumper cover of claim 1, wherein the anchor shaft and the anchor ring are integrally formed with each other.

5. The bumper cover of claim 1, wherein the anchor shaft is detachable from and attachable to the inner surface of the cap part.

6. The bumper cover of claim 1, wherein the anchor ring includes:
  a frame part including:
    a shaft extending perpendicular to the anchor shaft; and
    reinforcing members disposed on the shaft; and
  a variable hook part perpendicularly branching off into two branches from an end portion of the anchor shaft, and surrounding the frame part,
  wherein the variable hook part passes through the installation hole and includes fixing steps disposed in a part of a central portion of the variable hook part.

7. The bumper cover of claim 6, wherein the variable hook part has a width decreasing in a direction toward an end portion of the variable hook part passing through the installation hole.

8. A towing cap configured to open and close a hook hole disposed in a bumper cover for towing a vehicle body, the towing cap comprising:
  a cap part configured to open and close the hook hole; and
  an anchor part extending outward from the cap part in a bent shape and fixedly inserted into an installation hole disposed around the hook hole, the anchor part including an anchor shaft extending from an inner surface of the cap part, and an anchor ring bent outward from the anchor shaft and configured to be press-fitted to the installation hole,
  wherein the cap part is further configured to open the hook hole of the bumper cover in a state in which the cap part is out of contact with a hook passing through the hook hole, and
  wherein the cap part comprises protrusions that protrude at predetermined intervals from an outer surface of the cap part, each of the protrusions having a structure that slopes inclined downward in a direction from an outside of the cap part toward an inside of the cap part.

9. The towing cap of claim 8, wherein the anchor shaft is detachable from and attachable to the inner surface of the cap part.

10. The towing cap of claim 8, wherein the anchor ring includes:
  a frame part including:
  a shaft extending perpendicular to the anchor shaft; and
  reinforcing members disposed on the shaft; and
  a variable hook part perpendicularly branching off into two branches from an end portion of the anchor shaft, and surrounding the frame part.

11. A towing cap configured to open and close a hook hole disposed in a bumper cover of a vehicle, the towing cap comprising:
  a cap part configured to open and close the hook hole; and
  an anchor part including:
    an anchor shaft extending from an inner surface of one side of the cap part; and
    an anchor ring bent outward from the anchor shaft and press-fitted to an installation hole of the bumper cover,
  wherein the cap part is configured to be rotatable by using the anchor shaft as a rotary axis, and
  wherein the cap part comprises protrusions that protrude at predetermined intervals from an outer surface of the cap part, each of the protrusions having a structure that slopes inclined downward in a direction from an outside of the cap part toward an inside of the cap part.

12. The towing cap of claim 11, wherein the anchor shaft is detachable from and attachable to an inner surface of the cap part.

* * * * *